Sept. 21, 1965 W. B. BANKS 3,206,979
APPARATUS FOR MEASURING MATERIAL LEVEL
Filed June 17, 1963 5 Sheets-Sheet 1

William B. Banks
INVENTOR.

BY James F. Weiler
Jefferson D. Giller
William A. Stout
Paul L. DeVerter II
ATTORNEYS Sept. 21, 1965  W. B. BANKS  3,206,979
APPARATUS FOR MEASURING MATERIAL LEVEL
Filed June 17, 1963  5 Sheets-Sheet 2

William B. Banks
INVENTOR.

BY James F. Weiler
Jefferson D. Giller
William A. Stout
Paul L. DeVerter II
ATTORNEYS Sept. 21, 1965    W. B. BANKS    3,206,979
APPARATUS FOR MEASURING MATERIAL LEVEL
Filed June 17, 1963    5 Sheets-Sheet 3

William B. Banks
INVENTOR.

BY James F. Weiler
Jefferson D. Giller
William T. Stout
Paul L. DeVerter II
ATTORNEYS Sept. 21, 1965 W. B. BANKS 3,206,979
APPARATUS FOR MEASURING MATERIAL LEVEL
Filed June 17, 1963 5 Sheets-Sheet 4

Fig. 8

William B. Banks
INVENTOR.

BY James F. Weiler
Jefferson D. Giller
William A. Stout
Paul L. DeVerter II
ATTORNEYS

United States Patent Office 3,206,979
Patented Sept. 21, 1965

3,206,979
APPARATUS FOR MEASURING MATERIAL LEVEL
William B. Banks, Houston, Tex., assignor to Automation Products, Inc., a corporation of Texas
Filed June 17, 1963, Ser. No. 288,375
7 Claims. (Cl. 73—290)

The present invention relates to an apparatus for measuring material level, and more particularly relates to an apparatus which measures the level of a material by utilizing a material sensing device to locate and follow the material level.

My prior Patent No. 2,973,639, date March 7, 1961, entitled Mass Presence Sensing Device, and my copending Patent No. 3,100,390, dated August 13, 1963, entitled, Apparatus for and Method of Determining Physical Characteristics of Materials, disclose a material sensing apparatus which among other things can be used to indicate the level of a material. That is, the vibrating element of these devices will give a different response when it is in contact with the material from that response given when it is out of contact with the material. Therefore, a change in response is an indication of the upper surface of the material or the level of the material. The present invention is generally directed to an apparatus for measuring material level by means of any suitable material sensing means having a vibrating element, a driving coil, and a pickup coil such as shown in my above named patents and for monitoring and indicating the level of material.

The present invention is provided to determine the material levels of fluent materials such as fluid materials and flowable solids such as granular materials.

It is a general object of the present invention to provide an apparatus for measuring material levels by raising and lowering a material present sensing device which will ascertain the level of the material and which will monitor and measure the changing level of the material.

Yet a further object of the present invention is the provision of an apparatus for measuring material level by raising and lowering a material sensing device on a control cable and which is provided with an elongate packing member about the control cable into which a gaseous pressure is applied to maintain a pressure seal about the control cable in order that the material sensing means may operate in a pressurized container for monitoring the level of the material in the pressurized container.

Yet a further object of the present invention is the provision of an apparatus for measuring material levels in combination with a vibrating element suspended from a control cable and drive wheel in which a ratchet drive is utilized between a positioning motor which controls the control wheel to prevent the control cable from unwinding off the control wheel.

A still further object of the present invention is the provision of an apparatus for measuring and monitoring material levels wherein a vibrating element is periodically oscillated upwardly and downwardly to locate and monitor the level of the material.

A still further object of the present invention is the provision of a motor shutdown circuit for shutting down a positioning motor in an apparatus which measures material level by means of a vibrating element suspended on a control cable in order to prevent the motor from unwinding the cable.

Yet a still further object of the present invention is the provision of an apparatus for measuring material level by raising and lowering a material sensing device on a control cable wherein a measuring wheel which is movable in response to movement of the control cable is connected to a potentiometer which includes a sufficient slack in the drive gears of the potentiometer so as not to be actuated by the normal hunting oscillation applied to the material sensing means thereby preventing excessive wear in the potentiometer.

Yet a still further object of the present invention is the provision of apparatus for measuring material levels wherein an oscillating cam is provided to periodically raise and lower a control cable supporting the material sensing means thereby hunting for the material level so as to avoid wear on a positioning motor to provide the hunting movement.

A still further object of the present invention is the provision of an apparatus for measuring material levels by raising and lowering a material sensing device on a control cable which is wound about a control wheel in single layers to prevent damage or hanging up of the control cable.

Yet a still further object of the present invention is the provision of an apparatus for measuring material level wherein a material sensing device including a driving coil, a vibrating element which is driven by the drawing coil, and a pick up coil which generates a signal in proportion to the amplitude and vibration of the vibrating element is raised and lowered on a control cable for sensing the material level and a rectifier circuit is connected to the driving coil of the material sensing device to enable the control cable to operate through hazardous or explosive areas without causing dangerous conditions to exist.

A still further object of the present invention is the provision of an apparatus for measuring material levels wherein a control circuit is provided to actuate a positioning motor to raise and lower a material sensing device and the control circuit includes first and second periodically actuated switch means, the first of which actuates the positioning motor to move the sensing device downwardly until the sensing device indicates contact with the material, and a second switch means actuating said positioning motor to raise the sensing device upwardly until the sensing device indicates loss of contact of the sensing device with the material thereby providing a hunting action about and locating the material level.

Other and further objects, features and advantages of the present invention will be apparent from the following description of presently preferred embodiments of the present invention, given for the purpose of disclosure and taken in conjunction with the accompanying drawings, where like character references designate the parts throughout the several views, and where.

Generally, the present invention is directed to periodically oscillating a material sensing device on either side of the upper surface or level of the material to be monitored and includes a control circuit to insure that the material sensing device will follow and monitor the material level.

The material sensing device may be of any suitable type utilizing a driving coil, a vibratory element actuated by the driving coil, and a pickup coil which generates a signal in proportion to the amplitude of vibration of the vibrating element thereby indicating whether or not the vibrating element is in contact with the material. For instance, and referring to FIGURE 11, the material sensing device 10 here shown is similar to that in my copending Patent No. 3,100,390. Of course, other vibratory type sensing devices may be used such as disclosed in my Patent No. 2,973,639. However, it has been found that these devices are particularly satisfactory for measuring levels of granular materials as the elongated and unemcumbered paddles are not subject to being jammed by the material. Thus, the material sensing device 10 includes a driving coil 12 to which a suitable driving voltage such as 110 volts A.C. may be applied, and which vibrates a first vibratory rod 14 and in turn vibrates a paddle 16 and a second vibratory rod 18 in response to the driving voltage applied to driving coil 12. A pickup coil 20 generates a signal in proportion to the amplitude of vibration of the vibrating element 18 which in turn depends upon whether or not the paddle 16 is in contact with the material to be measured. Thus, a low signal output from the coil 20 indicates that the paddle 16 is in contact with a material while a high signal output indicates that the paddle 16 is not in contact with the material. No further description is believed necessary as any suitable material sensing device such as described in my above named patents may be used. The electrical leads from the driving coil 12 and the pickup coil 20 lead to a control cable 22 which will be more fully described hereinafter.

Figure 1:
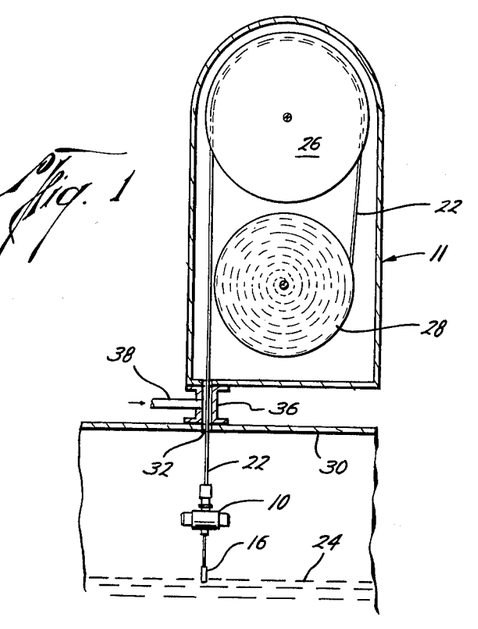
FIGURE 1 is a fragmentary elevational view, partly in cross-section, illustrating one embodiment of the present invention.
Figure 2:
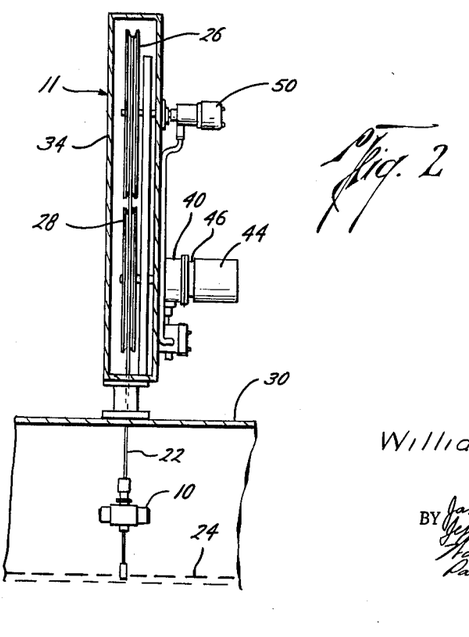
FIGURE 2 is a fragmentary side view, in cross-section, of the apparatus of FIGURE 1.
Figure 3:
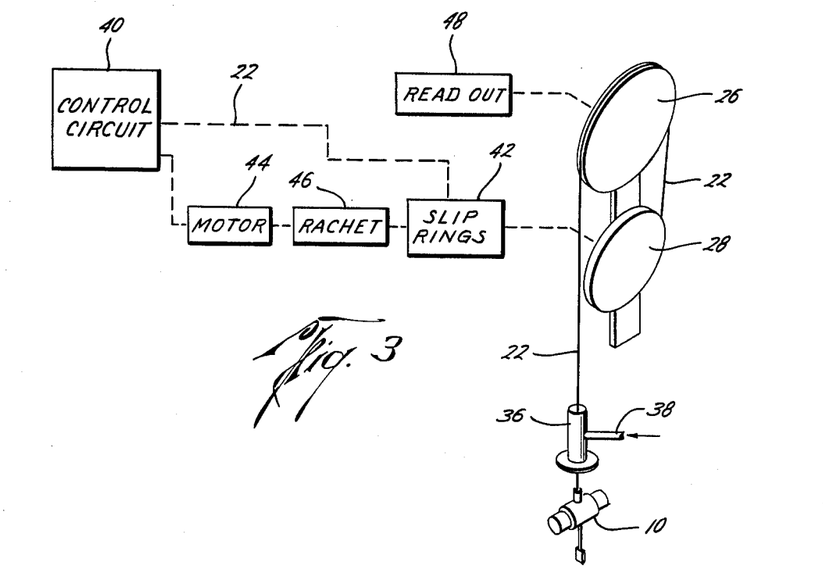
FIGURE 3 is a diagrammatic layout, partly in perspective and partly in block diagram, illustrating the apparatus of FIGURE 1 and its relationship with the other components of present invention.

Referring now to FIGURES 1, 2 and 3, the apparatus of the present invention, generally indicated by the numeral 11, for raising and lowering the material sensing device 10 for hunting and monitoring the level of a material 24 is best seen. A control cable 22 is connected to and supports the material sensing device 10 and is in turn supported over a measuring wheel 26 whereby the measuring wheel moves in response to the movement of the control cable 24 and the material sensing device 10 so that its angular position is an indication of the vertical position of the material sensing means 10 and thus of the level of the material 24 which the sensing means 10 monitors. The control cable 22 after passing over the measuring wheel 26 is wound about a positioning control wheel 28 and connected thereto so that the angular position of the control wheel 28 controls the vertical movement of the material sensing device 10. The control cable 22 is a relatively delicate and an expensive item and it is preferable that the control wheel 28 be shaped to wind the control cable 22 thereon in single layers to prevent hanging up or otherwise damaging the wire line control cable 22 which includes the electrical leads to the driving and pickup coils 12 and 20 (FIGURE 11) of the material sensing means 10.

Normally, the material 24 to be measured is in a suitable container 30 with the control cable 22 extending through an opening 32 into the container 30. Of course, a suitable housing 34 may be provided to enclose the control cable 22 and wheels 26 and 28 and journal them therein.

As the material 24 in the container 30 is sometimes under pressure a suitable sealing structure may be provided to prevent loss of pressure in the container 30. Thus, an elongate tubing 36 is provided through which the control cable 22 may pass and which forms a slight seal with the tubing 36. Thus, because of the use of an elongate tubing 36 a small pull, for instance five pounds, will pull the control cable through the sealing tube 36 but will maintain a higher pressure seal, for instance, 40 pounds in the container 30. In addition, if desired, a pressure inlet tube 38 may be provided connected to the elongate tube 36 for the admission of a suitable gas or air to pressurize the tube 36 and maintain an increased pressure seal about the control cable 22 thereby maintaining the pressure in the container 30.

Referring particularly to FIGURES 2 and 3 the other structural and operational components of the present apparatus are best seen. A control circuit 40 is provided, which will be more fully discussed hereinafter, which energizes the driving coil 12 and receives signals from the pickup coil 20 through a slip ring assembly 42 which is electrically connected in the control cable 22. Also, the control circuit 40 controls a positioning motor 44 for driving, through a ratchet assembly 46 the control wheel 28 for raising and lowering the material sensing device 10 to locate and hunt for the level of the material 24. The control circuit 40 periodically actuates the positioning motor 44 to rotate the control wheel 28 to raise the material sensing device 10 until it loses contact with the material 24 at which time a signal from the signal coil 20 (FIGURE 11) of the material sensing device 10 reverses the control circuit and positioning motor 44 to lower the material sensing means 10 until it again makes contact with the material 24 thereby providing a hunting type action to locate the level of the material 24. A suitable readout or measuring circuit 48 is provided which includes an electrical potentiometer 50 connected to the measuring wheel 26 which is rotated by the movement of the control cable 22 to measure the vertical position of the material sensing device 10, and thus the level of the material 24.

Figure 5:
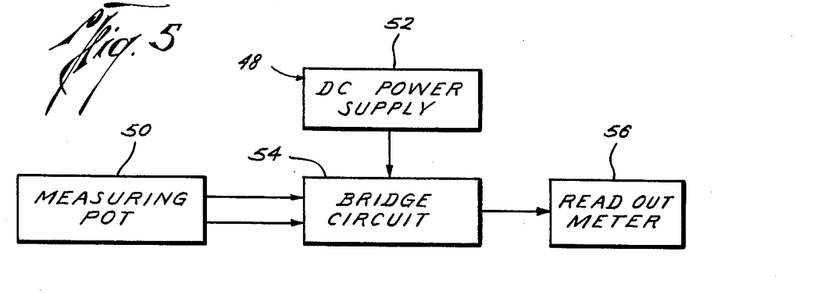
FIGURE 5 is an electrical block diagram illustrating the measuring circuit of the present invention.

Referring now to FIGURE 5 the electrical schematic of the readout or measuring circuit 48 is best seen. There is included a D.C. power supply 52 which may be connected to any suitable bridge circuit 54 which in turn receives the elevational signals from the measuring potentiometer 50 caused by rotation of the measuring wheel 26 and which transmits the signal to a suitable readout meter 56. As all of these elements are conventional, and no further description is believed to be necessary. However, it should be pointed out that it has been found desirable that the drive gears between the measuring potentiometer 50 and the measuring wheel 26 include a suitable amount of slack so as not to be actuated or not to sense the change in the vertical position of the material sensing means 10 during the small movement of travel during which it hunts or oscillates about the upper surface of the material 24. For instance, in a measuring wheel 26 having a diameter of 18 inches, a 7 degree slack or nonmovement of the drive gears may be provided so that for a hunting interval of a quarter of an inch of the material sensing device 10 no actuation of the electrical potentiometer 50 will occur. This feature prevents excessive wear in the electrical potentiometer during the periods in which the material sensing device 10 is oscillating upwardly and downwardly.

Figure 7:
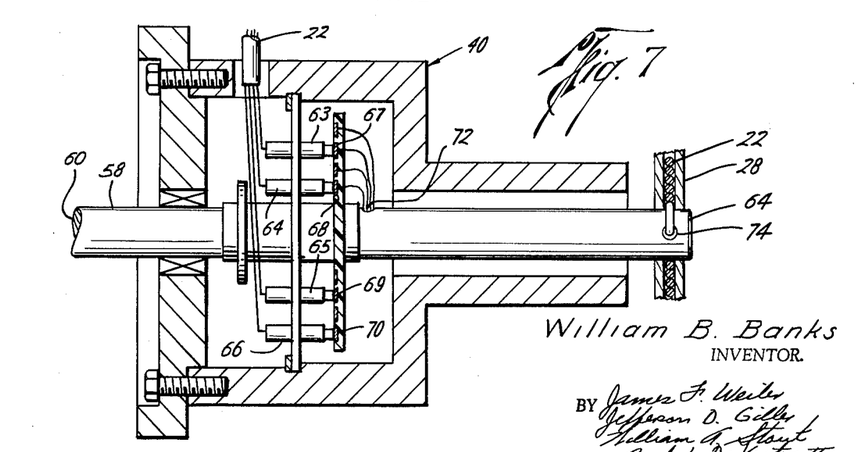
FIGURE 7 is an enlarged elevational view, partly in cross-section, illustrating the slip ring assembly of the present invention.

Referring now to FIGURE 7, the slip ring mechanism 40 of the present invention may be best seen. A shaft 58 the end 60 of which is connected to the ratchet drive 46, as will be more fully described hereinafter, is suitably journalled in a housing 62 of the slip ring assembly 40. The second end 64 of the shaft 58 is connected to and drives the control wheel 28. The control cable 22 leading into the housing 62 from the control circuit 40 (FIGURE 3) is connected to suitable terminals 63, 64, 65 and 66 which are in turn connected to slip rings 67, 68 and 69 and 70, respectively. The end of the control cable 22 leading to the driving coil 12 and pickup coil 20 (FIGURE 11) is connected from the slip rings 67, 68, 69 and 70, passes through an opening 72 in the shaft 58 and out of a second opening 74 to be wound around the shaft and in the control wheel 28.

Figure 8:
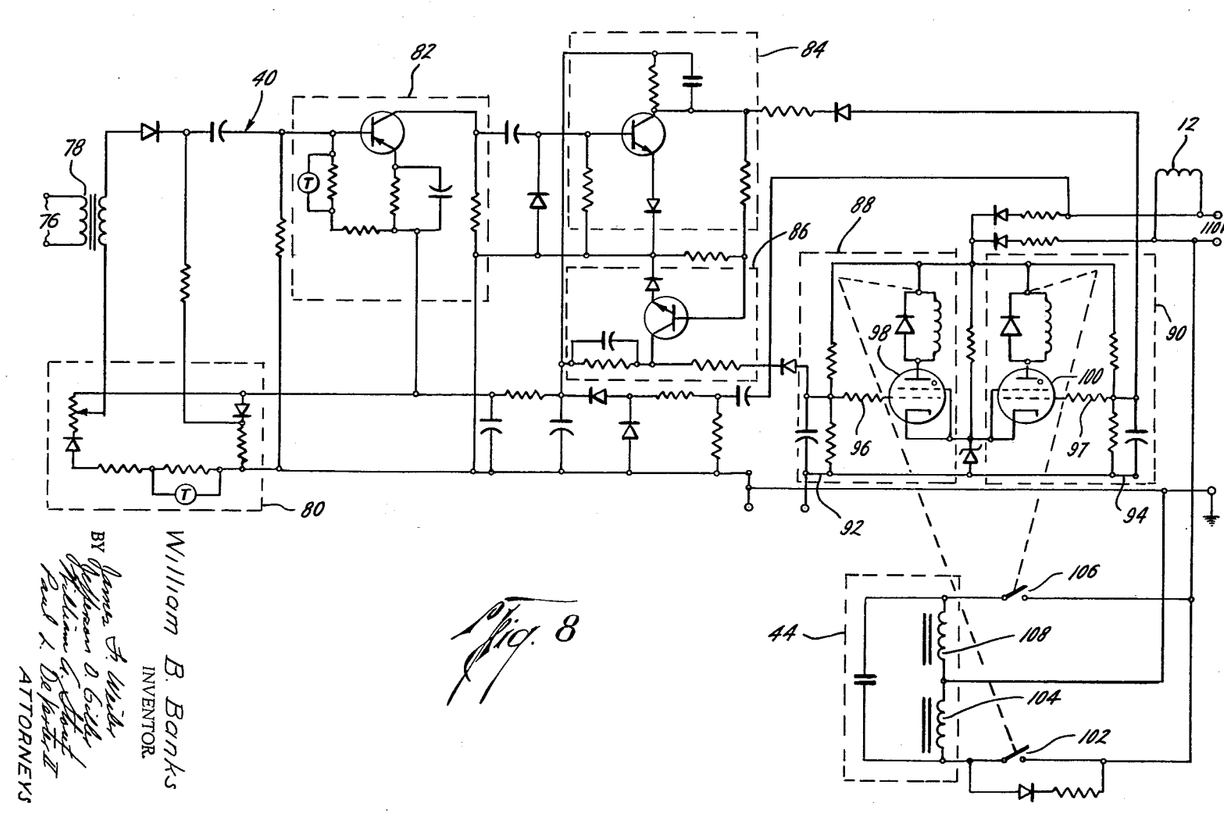
FIGURE 8 is an electrical schematic of the control circuit for positioning the material sensing device used with the present invention.

Referring now to FIGURE 8, the operation of the control circuit 40 is best seen. First, the material sensing means pickup coil 20, which is responsive to whether or not the material sensing means is in contact with the material 24 is connected to input terminals 76 and input transformer 78. The signal from the pickup coil 20 then passes through a D.C. bypass circuit 80 which monitors the incoming A.C. pickup signal and passes it on to the remainder of the control circuit when it is larger than a preselected value, but blocks the incoming pickup signal when it is below that preselected value. Thus, when the paddle 16 of the material sensing device 10 (FIGURE 11) is in contact with the material to be measured the signal from the pickup coil 20 will be low and will be blocked by the D.C. bypass circuit 80. However, when the paddle 16 is not in contact with the material the signal output from the pickup coil 20 will increase and will become larger than the preselected cutoff value of the D.C. bypass circuit 80 and will be passed on to the remainder of the control circuit.

Thus, when a pickup signal from pickup coil 20 exceeds the preselected value and is passed from the D.C. bypass circuit 10 it passes to amplifier 82. Electrical control switches 84 and 86 are provided connected to the amplifier 82, one of which is actuated when the incoming signal is above the preselected value and the second of which is actuated when the incoming signal to the amplifier 82 is below the preselected value. The control switches 84 and 86 in turn control and actuate power switches 88 and 90, respectively, to actuate the positioning motor 44 first in one direction and then in the reverse direction, respectively. The power switches 88 and 90 include a conventional RC timing circuit which is connected in the timing circuits 92 and 94 of the power switches 88 and 90, respectively, which is in turn connected to the grids 96 and 97, respectively, of electron tubes 98 and 100, respectively, of the power switches 88 and 90, respectively. Preferably, the time constant of the RC circuits are so set so that a time delay is provided before the tubes 98 and 10 are allowed to conduct after the power switches 88 and 90 are actuated. However, when the power switches 88 and 90 are deactuated they are arranged to cut off quickly and thus provide a minimum of wear on the positioning motor 44 which is required to oscillate first in one direction and then in the other direction.

Thus, when control switch 84 is actuated by a high incoming signal, it shorts the grid of the power switch 90 and allows the power switch 88 to turn on and to be actuated after a predetermined time interval depending upon the RC timing circuit 92. When the power switch 88 is then actuated, switch 102 is closed thereby energizing coil 104 of the positioning motor 44 to energize the motor 44 and turn it in a direction to allow the material sensing device 10 to be lowered and to contact the material. As soon as the material is contacted by the paddle 16 the output signal from the pickup coil 20 is reduced and this reduced signal is transmitted through the control cable 22 to the slip ring assembly 42 and control cable 22 to the control circuit 40. This shuts down control switch 84 and energizes control switch 86. Control switch 86 then shorts the grid of the power switch 88 which immediately opens switch 102 which stops the positioning motor 44, and the further downward movement of the material sensing means 10. Since at this time power switch 90 is no longer shorted out, the time delay RC circuit 94 is turned on and after a predetermined time allows the grid 97 to conduct and actuate tube 100 so as to energize the power switch 90 thereby closing switch 106 which in turn energizes motor coil 108 of the positioning motor 44 in the reverse direction to which it has been previously energized so as to cause the material sensing means to be raised by way of the control wheel 28. When the paddle 16 is removed from the material, the output signal from the pickup coil 20 increases thereby repeating the cycle. Thus, the control circuit 40 causes the material sensing means 10 to oscillate upward and downward preferably in a very short range, of say one quarter of an inch, when the material level of the material remains unchanged. Of course, should the material level change, the positioning motor 44 will find the level of the material as the paddle 16 is oscillated upwardly and downwardly as the motor will only reverse when the paddle 16 encounters and is retracted from the material 24.

Figures 9, 10, 11:
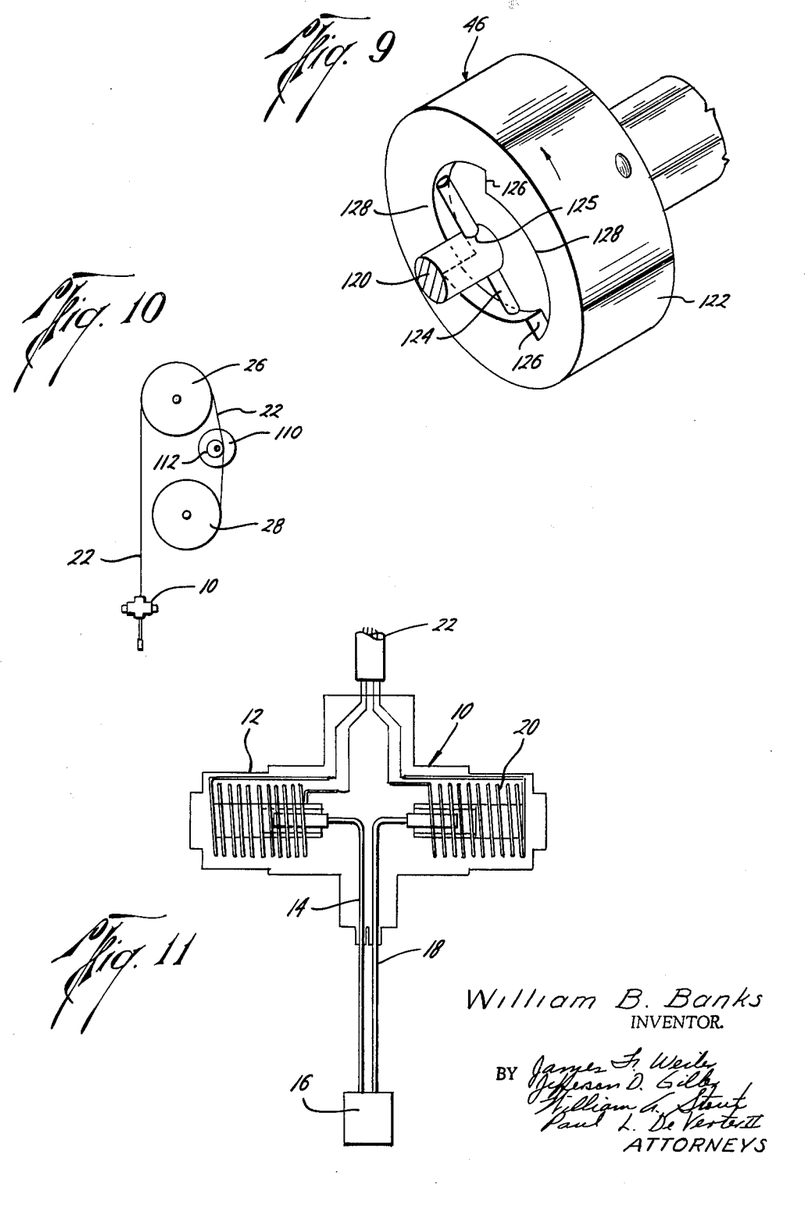
FIGURE 9 is a perspective view of the ratchet drive mechanism of the present invention.
FIGURE 10 is an elevational view, in schematic, illustrating the use of an oscillating cam movement with the present invention for providing the periodic raising and lowering operation of the control cable and material sensing device.
FIGURE 11 is a schematic elevational view of a suitable type of material sensing device that may be utilized with the present invention.

In order to avoid the wear and tear on the positioning motor 44 which is required to provide the oscillating upward and downward movement of the material sensing device 10 caused by the starting, stopping and reversing of the motor, it may be desirable to utilize an eccentric to provide the hunting movement of the material sensing device 10 and merely use the positioning motor 44 in the event of change of level of the material. Referring now to FIGURE 10, a continuously rotatable wheel 110 may be provided which includes an eccentrically spaced shoulder 112 which contacts the control cable 22 and alternately raises and lowers the material sensing device 10 as the wheel 110 is rotated. This will provide the hunting or oscillating up and down movement of the material sensing device 10 without requiring the actuation of the positioning motor 44 so long as the material level remains at the same position. Of course, once the material level changes its position so that an oscillating movement of the eccentric 112 did not change the output signal from the detector coil 20, the positioning motor would again act in accordance with the control circuit 40 to position the material sensing device 10 at the new material level. Of course, the eccentric is continuously run and must run at a rate that is faster than the RC timing circuits 92 and 94 of the control circuit of FIGURE 8 in order to deactuate the power control switches 88 and 90 prior to the time on which they are actuated by their respective timing circuits.

Referring now to FIGURES 3 and 9, the ratchet drive may be omitted and the motor 44 connected directly to the control wheel 28 for driving the control wheel in either direction. However, the ratchet is desirable, particularly in measuring such materials as granular materials as it prevents the material sensing device 10 from becoming overdriven to the bottom and positioned on the material so as to allow the control cable 22 to jump off of the wheels 26 and 28 and possibly bend and break the cable. The ratchet assembly 46, as best seen in FIGURE 9, allows the positioning motor 44 to only pull the material sensing device 10 upwardly, but will not provide a positive drive to drive the sensing device downwardly. Instead, the cable 22 is allowed to be pulled downwardly by the weight of the material sensing device 10. Thus, the ratchet assembly 46 includes a shaft 120 which rotates through the housing 122 and is connected thereto to a pawl 124 which is slidable through an opening 125 in the shaft 120. The shaft 120 is connected to the slip ring shaft 58 shown in FIGURE 7. The housing 122 is directly coupled to the motor shaft (not shown) and includes drive shoulders 126 which contact the pawl 124 and provide a positive drive when the housing 122 is rotated in the counterclockwise direction as indicated by the arrow. The housing also includes ratchet cam surfaces 128 so that when the housing is rotated in a clockwise direction, it will not provide a positive drive on the control cable and material sensing means 10 but will only allow the sensing device 10 to be pulled downwardly by tension and when that tension no longer exists, the housing 122 may continue to rotate in a clockwise direction but the ratchet connection will continue to slip as the pawl member 124 is moved first one way and then the other through the opening 125 in the shaft 120 along the cam surfaces 128. Thus, since this is only a permissive drive in the downward direction, the control cable 22 will be protected and not allowed to unwind from wheels 26 and 28 and jump from the tracks on the wheels 26 and 28.

Figure 6:
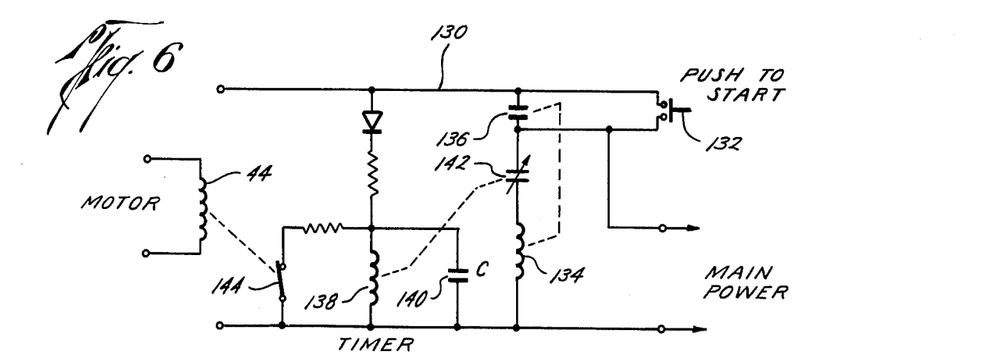
FIGURE 6 is an auxiliary motor shutdown circuit that may be utilized with the present invention for shutting down the positioning motor used in the present invention when it operates more than a predetermined amount of time.

Another safety auxiliary that may be used is an auxiliary motor shutdown circuit as shown in FIGURE 6. The purpose of this shutdown circuit is to deactuate the positioning motor 44 in the event that it runs for more than a predetermined amount of time, for instance thirty seconds, as it is obvious that something is amiss as the material level would not normally change during each hunting cycle to cause the motor to change the position of the material sensing device 10 the distance it would move in thirty seconds. The shutdown circuit 130 includes a conventional starting switch 132 which when actuated closes contact 136 to close in the motor circuit through coil 134 to maintain the motor in the on position. A timing circuit consisting of an inductance coil 138 and condenser 140 is provided. The coil 138 controls the actuation of contacts 142 which are normally closed as the coil 138 is normally de-energized. The motor 44 controls a switch 144 which is normally closed when the motor is stopped. Therefore, when the switch 144 is closed and the circuit 130 is energized, the switch 144 will discharge the condenser 140 and prevent it from the switch 144 is open and the condenser 140 is charging. th switch 144 is open and the condenser 140 is charging. Should the motor run long enough to allow the condenser to charge up a sufficient voltage across the coil 138 the contacts 142 will open thereby shutting down the entire motor control circuit 130. However, as long as the motor 44 shuts down prior to the predetermined time interval, the condenser 140 will be discharged and the circuit 130 will not be deactuated.

Figure 4:
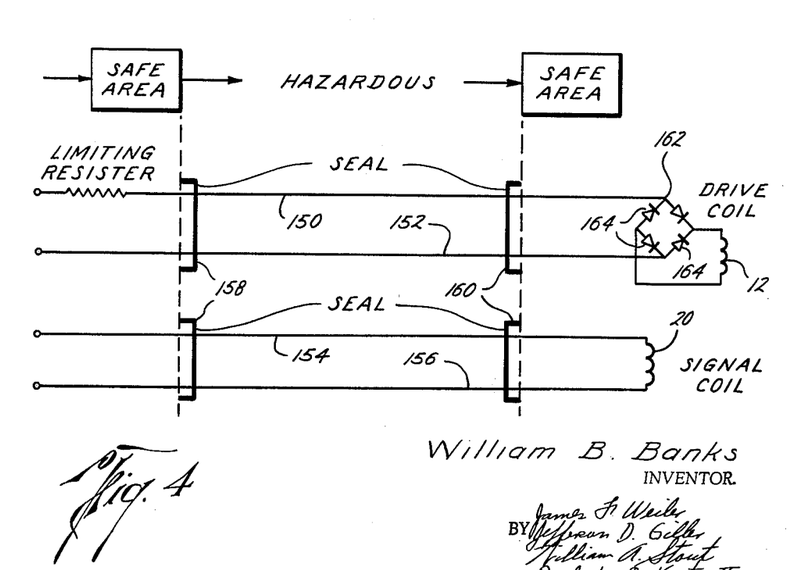
FIGURE 4 is a schematic diagram illustrating an auxiliary electrical circuit to be used when the present invention is positioned in a hazardous or explosive area.

In some installations the present apparatus will be desired to be used in so-called hazardous or explosive areas, that is, areas whose ambient surroundings are subject to explosion by an electrical spark of sufficient magnitude. Since the control cable 22 is flexible and moving, it cannot be sealed off against explosion by conventional methods. Referring to FIGURE 4 an additional auxiliary bridge circuit is provided in the electrical leads to the driving coil 12 to prevent or reduce electrical hazards. The control cable 22 consists of a pair of leads 150 and 152 for supplying a voltage usually of 115 volts alternating current to the driving coil 12. Also, the control cable includes leads 154 and 156 from the signal coil 20. As the voltage generated in the signal coil 20 is of low magnitude which creates a low current, generally of the magnitude of 100 micro-amps there is no hazard in case of a failure or short in the lines 154 and 156. However, since a higher voltage is utilized in the lines 150 and 152 and a portion of the line will be subject to being in a hazardous area even though suitable seals 158 and 160 are provided at each terminal location, a dangerous condition would exist in the event of a fault in lines 150 and 152. Therefore, a suitable four way rectifying bridge 162 is provided between the lines 150 and 152 adjacent the drive coil 12 which may include suitable diodes 164. This bridge will rectify the alternating current, but will still provide a pulsating drive necessary at the drive coil 12. While the normal current in the high voltage lines 150 and 152 is at a satisfactory low level, for instance, 30 milliamps, to avoid hazardous conditions, a hazardous condition could arise because of the inductance in the drive coil 12 whereby a fault in the lines 150 and 152 could cause a higher voltage and dangerous condition. However, because of the one way bridge circuit 162 there can be no passage of any high voltage fault from the inductance coil 12 back into the lines 150 and 152. To create a hazard with the bridge circuit 162 the unlikely situation would have to occur that two diodes would fail to open, one on each of the legs of the bridge and the cable itself would have to have a fault simultaneously.

In use, the apparatus of the present invention is as shown in FIGURES 1, 2 and 3 with the control cable 22 supporting the material sensing means 10 and is wound over measuring wheel 26 and wound around control wheel 28. The apparatus 10, as best seen in FIGURE 11, is continuously operating with a suitable drive voltage applied to the driving coil 12 which in turn continuously vibrates the paddle 16 and with a signal output generated in the pickup coil 20, the level of which depends upon whether or not the paddle 16 is in contact or not with the material 24. The control cable 22 passes through the slip ring assembly of FIGURE 7 and thence by line 22 to the control circuit 40, which is best seen in FIGURE 8. Assuming that the paddle 16 of the material sensing device 10 (FIGURE 11) is in contact with the material to be measured, a low signal output is generated by the pickup coil 20 and transmitted to the terminals 76 of the control circuit 40, and because the signal is below the preselected magnitude, it is blocked out by the D.C. biasing circuit 80. In that event control switch 86 is actuated which shorts the grid of power switch 88 but allows the time delay circuit of the RC circuit 94 of power switch 90 to begin to build up until it triggers tube 100 causing the power switch 90 to be actuated closing switch 106 to energize the positioning motor 44 in a direction to raise the material sensing device 10. Assuming that the material level has not changed since the last measuring cycle the material sensing means 10 will move up only a short distance, for instance one quarter of an inch, at which time the paddle 16 of the material sensing device 10 will be out of contact with the material thereby generating an increased voltage in the pickup coil 20 which is applied to the terminals 76 of the control circuit 40. This in turn actuates control switch 84 and deactuates control switch 86 and starts the time delay RC circuit 92 of the control switch 88 to operate and at the same time cuts off the power switch 90 by shorting out the grid thereby opening switch 106 causing the positioning motor 44 and the material sensing device 10 to stop.

Movement upward of the material sensing means and control cable 22 will rotate the measuring wheel 26. Preferably, the gears on the potentiometer 50 connected to the measuring wheel 26 have a sufficient amount of slack, for instance seven degrees, so that during the normal hunting movement of the material sensing device 10 no change in the readout level is indicated in the readout circuit 48 (FIGURES 3 and 5). However, assuming that the material level 44 has risen, the positioning motor 44 would have continued to operate and raise the material sensing means until the paddle 16 is out of the material and thus would have rotated the measuring wheel 26 which is best seen in FIGURE 5 would provide an indication to the bridge circuit 54 and to a conventional readout meter 56.

Returning again to FIGURE 8 and assuming that the paddle 16 has just been moved upwardly and out of contact with the material 24 and motor 44 stopped, the time delay circuit 92 is now energized and after the time delay, the power control circuit 88 is energized causing the switch 102 to be closed thereby again energizing the motor 44, but this time through coil 104 which drives the motor in a reverse direction to move the material sensing means 10 downwardly. If the material level has not moved since the last hunting cycle, the paddle 16 will be moved downwardly again and into contact with the material 24.

If the material level has moved upwardly any distance, the paddle 16 will quickly encounter the material change and stop the positioning motor and downward movement of the paddle. On the other hand, if the material level has receded, the positioning motor will continue to lower the material sensing means 10 until the paddle 16 does contact the material 24. Again, a material change in the vertical position of the material sensing means 10 outside of the normal hunting cycle causes rotation of the measuring wheel 26 and a corresponding change in the readout meter 56 of the readout circuit 48 (FIGURES 3 and 5).

Therefore, the control circuit alternately moves the material sensing means 10 periodically upwardly and downwardly on either side of the top surface of the material 24 and follows the movement of that surface at all times. And as the level of the surface of the material changes, the material sensing device 10 moves to follow the level. Of course, the RC timing circuits 92 and 94 may be suitably set to control the rate of the hunting cycle. Normally, it is desirable to have them as slow as possible, but providing the desired measuring requirements, in order to save excessive starting and stopping on the positioning motor 44.

However, as best seen in FIGURE 10, a continuously rotating eccentric 112 on a rotating wheel 110 may be provided which normally raises and lowers the control cable 22 and material sensing device 10 at a faster rate than the timing circuits 92 and 94 of the control circuit 40 (FIGURE 8) to eliminate the operation of the positioning motor 44 merely on the oscillation cycles. In that event, the operation of the positioning motor 44 would not occur until there had been a change in the level of the material being measured as the signal from the coil 20 would change and short out the power switches 88 and 90 before the time delay circuits 92 and 94 were able to actuate the power switches. However, as soon as there was a change in the level of the material, the change caused by the oscillation of the sensing device 10 by the eccentric 112 would no longer change the signal output from coil 20 so as to short out the power switches 88 and 90 and the positioning motor 44 would then be actuated to locate the material level as previously described.

In order to prevent unwinding of the control cable off the wheels 26 and 28, the use of the ratchet assembly 46 is desirable. This provides only a positive drive in an upward direction for raising the material sensing device 10 but merely allows a permissive tension to pull to move the apparatus 10 downwardly whereby when the apparatus 10 encounters support which reduces the tension, the ratchet mechanism will merely rotate when the housing 122 is moved in a clockwise direction without causing any further downward movement of the apparatus 10 and the possibility of unwinding the cable 22 from the wheels 26 and 28.

As shown in FIGURES 1 and 3 the elongate tubular member 36 may be utilized to provide a sealing contact with the control cable 22 to maintain pressure conditions in the container 30 holding the material 24. To further increase the effectiveness of the seal of the member 36 a pressure inlet 38 may be provided to which air or other gas may be supplied to increase the seal. In the event that the installation is in a hazardous or explosive area the four way rectifying bridge 162, shown in FIGURE 4, may be utilized in the lead lines 150 and 152 going to the drive coil 12. This eliminates the hazards caused by faults occurring in these particular lead lines which cannot otherwise be satisfactorily protected.

The auxiliary safety shut down circuit 130, as best seen in FIGURE 6, may be used with the positioning motor 44 to insure its shut down when it has run in one direction an excessive length of time. Thus, when the motor 44 is running the switch 144 is open thereby allowing the timing condensor 140 to charge and to actuate coil 138 which in turn opens the motor circuit by opening contact 142 in the event that the motor 44 does not stop sufficiently soon to close the switch 144 and dicharge the timing condensor 140.

The present invention, therefore, is well suited and adapted to attain the ends and objects mentioned herein as well as others inherent therein. While presently preferred embodiments of the invention are given for the purpose of disclosure, numerous changes in the details of construction and arrangements of parts may be made which are within the spirit of the invention and the scope of the appended claims.

What is claimed is:

1. In an apparatus for measuring material level by means of a vibrating element which is responsive to contact with the material, a control cable connected to and supporting the vibrating element, measuring means connected to the control cable moving in response to the movement of the control cable for measuring the position of the vibrating element, a control wheel connected to the control cable for raising and lowering the cable and vibrating element, a positioning motor connected to the control wheel for rotating the control wheel, and a control circuit connected to the vibrating element and to the positioning motor for oscillating the vibrating element above and below whatever level the material resides, the improvement in a mechanism for reducing wear on the motor comprising:

an oscillating cam periodically raising and lowering the control cable and vibrating element, means for oscillating said cam at a rate greater than the oscillating rate of said control circuit whereby the oscillation of the vibrating element will be controlled by the oscillating cam.

2. The invention of claim 1 including, an elongate tubular member positioned above said vibrating element and engaging a portion of the control cable in a sealing relationship, and a gaseous inlet to said tubular member.

3. The invention of claim 1 wherein the cable is wound about the control wheel in single layers.

4. The invention is claim 1 including, a motor shut down circuit for shutting down the positioning motor when it runs more than an amount of time required for the vibrating element to move to a new material level.

5. An apparatus for measuring material level by means of a vibrating element which is responsive to contact with the material comprising, a control cable connected to and supporting said vibrating element, measuring means connected to the control cable and movable in response to movement of said control cable for measuring the position of said vibrating element, a control wheel connected to said control cable for raising and allowing the lowering of said cable and said vibrating element, a positioning motor connected to the control wheel for rotating the control wheel, a one-way ratchet drive between the positioning motor and the control wheel providing a positive drive between the positioning motor and control wheel for raising the vibrating element, but when the motor is operating to lower said vibrating element said ratchet drive allows the vibrating element to pull the cable downwardly but prevents positive drive downwardly by the motor thereby preventing the control cable from unwinding from either of said wheels, and a control circuit connected to said vibrating element and to said positioning motor for oscillating said vibrating element above and below said material level.

6. The invention of claim 5 including, an oscillating cam periodically raising and lowering said control cable and vibrating element, means for oscillating said cam at a time rate faster than the time the control circuit actuates the positioning motor for oscillating the vibrating element about the material level.

7. In apparatus for measuring material level which includes a driving coil, a vibrating element which is driven by the driving coil, a pick-up coil which generates a signal in proportion to the amplitude of vibration, a vibrating coil thereby indicating whether the vibrating element is in contact with the material, a control cable connected to said material sensing device, a measuring wheel contacting said control cable in response to movement of said control cable thereby being responsive to movement of the material sensing device, a control wheel connected to said control cable for raising and lowering the cable and the vibrating element, a positioning motor connected to the control wheel for rotating the control wheel, and a control circuit connected to said vibrating element and to said positioning motor for oscillating the vibrating element about the material level, the improvement comprising, a single-phase full wave bridge rectifier connected to and supplying the driving coil with pulsating direct current, said rectifier being positioned in a non-hazardous explosive area.

References Cited by the Examiner

UNITED STATES PATENTS

| 1,746,616 | 2/30 | Sounitza | 33—126 |
| 2,555,593 | 6/51 | Lee | 73—321 |
| 2,585,680 | 2/52 | Quist | 73—290 |
| 2,808,581 | 10/57 | Findlay | 73—290 |
| 3,017,771 | 1/62 | Bonhomme | 73—290 |

FOREIGN PATENTS 262,607  12/26  Great Britain.

ISAAC LISANN, *Primary Examiner.*